UNITED STATES PATENT OFFICE.

ADOLF GENTZSCH, OF VIENNA, AUSTRIA-HUNGARY.

COMPOSITION FOR ELECTRIC INSULATION AND PROCESS OF MAKING SAME.

SPECIFICATION forming part of Letters Patent No. 559,376, dated May 5, 1896.

Application filed April 5, 1893. Serial No. 469,205. (No specimens.)

*To all whom it may concern:*

Be it known that I, ADOLF GENTZSCH, a subject of the Emperor of Germany, residing at Vienna, Austria-Hungary, have invented certain new and useful Improvements in Composition for Electric Insulation and Process of Making the Same, of which the following is a specification.

My invention has for its object the production of a composition of matter for insulating electric wires and cables. This composition is intended to offer a high insulating power, to contain no acids, to be non-hygroscopic, sufficiently pliable and elastic, indifferent against changes of temperature, and possessing a low melting-point and a comparatively high setting-point of temperature.

My composition is produced from shellac, colophonium, (rosin,) birch-tar oil, anilin-oil, and anthracene. As my object is to produce by this new composition a substitute for gutta-percha, I employ the shellac for obtaining a substitute for the resin contained in gutta-percha by subjecting it to the process to be described. For transforming this resin, which is insoluble in water and which is originally brittle, into a soft and plastic substance, I employ anthracene. This plastic substance is also insoluble in water, and as I remove all the water contained in the other ingredients, as to be described, it follows that I must obtain a product possessing high resistance against water. This property is augmented by the addition of the birch-tar oil, which of all oils appears to be best qualified for waterproofing. Other oils I employ only for the purpose of giving to the composition the required degree of liquidity to permit its easy application to the wires.

The materials for producing the insulating composition are by preference employed in the following proportions by weight: fifty parts shellac, fifty parts rosin, five parts birch-tar oil, five parts anilin-oil, and twenty parts anthracene.

The composition is prepared and produced in the following manner: The desired quantity of shellac is placed into a vessel and covered with water, the rosin being treated in the same manner in another vessel. The shellac and rosin are stirred from time to time, and both are left in the water for about twenty-four hours. Then the water is drawn off and fresh water supplied, and the same treatment is repeated several times. In this manner all soluble substances are removed from the shellac and rosin. The birch-tar and anilin oil are boiled in water in another vessel. The shellac and rosin having been removed from the water are now placed in equal parts in a vessel and subjected to a temperature of 150° to 180° centigrade, so as to become melted and to boil, the vessel being covered up tightly from time to time. After boiling for about one-half to three-quarters of an hour the mass, which at first was clear and liquid, expands and becomes spongy. Now the vessel is covered tightly and the temperature is raised to 400° centigrade. Now the spongy mass becomes again liquid, and its color, which originally was yellow, changes into a dark reddish brown, becoming brownish black when the two materials have thoroughly combined. The resinous product thus obtained is in its cold solid state rather brittle, but has now the property, which it did not possess before, of combining with oil, fat, or wax of any kind. This product is also insoluble in water and will stand temperatures far beyond 400° centigrade without its qualities being impaired. Now the anthracene is melted in a separate vessel, and in another vessel the birch-tar and anilin oils are again heated, by preference in an oil-bath, in order to drive off any water still contained in them. Instead of the anilin-oil and birch-tar oil any other oil may be employed; but, as already stated, I prefer the two oils mentioned as giving better results than any others.

The composition is finished by mixing the described ingredients in their molten state. The wires or cables to be insulated are immersed into the molten composition.

Any desired greater hardness or softness of the composition may be obtained by adding less or more of the oils.

What I claim is—

1. A composition of matter for electric insulation consisting of shellac and rosin, of birch-tar oil and anilin-oil, and of anthracene, substantially as and in the proportions herein described.

2. The process for preparing the herein-described composition of matter for electric insulation, consisting in first treating the shellac and rosin with water, then melting and boiling the shellac and rosin together, melting the anthracene, and finally mixing the ingredients together in molten state, adding anilin-oil and birch-tar oil, which have previously been freed of the water they contain and of all matters soluble in water; substantially as described.

In testimony whereof I have affixed my signature in presence of two witnesses.

ADOLF GENTZSCH.

Witnesses:
   A. SCHLESSING,
   ROBT. B. GENTZSCH.